June 7, 1938. A. CAPROTTI 2,119,904
VARIABLE VALVE LIFT FOR OSCILLATING VALVE GEARS
Filed Sept. 10, 1935 3 Sheets-Sheet 1

A. Caprotti
INVENTOR
By Glascock Downing & Seebold
Attys.

June 7, 1938.   A. CAPROTTI   2,119,904
VARIABLE VALVE LIFT FOR OSCILLATING VALVE GEARS
Filed Sept. 10, 1935   3 Sheets-Sheet 2

June 7, 1938. A. CAPROTTI 2,119,904
VARIABLE VALVE LIFT FOR OSCILLATING VALVE GEARS
Filed Sept. 10, 1935 3 Sheets-Sheet 3

A. Caprotti
INVENTOR

By: Glascock Downing & Seebold
ATYS.

UNITED STATES PATENT OFFICE 2,119,904

VARIABLE VALVE LIFT FOR OSCILLATING VALVE GEARS

Arturo Caprotti, Milan, Italy

Application September 10, 1935, Serial No. 39,988
In France September 13, 1934

7 Claims. (Cl. 121—166)

The use of oscillating valve gear with separate inlet and exhaust valves for each cylinder has led to certain advantages for example the elimination of sliding surfaces in poppet valves but the valve vents have not been improved. On the contrary owing to small inlet valve travel the inlet ports have been diminished at shortest cut offs causing increased wire drawing of the operating fluid.

In order to minimize wire drawing it has been proposed to improve the construction of the cams and other oscillating members which convert the motion of the ordinary D or single piston valve into the motions of the various separate valves. This has not solved the problem since the speeds of the said members vary with the cut offs and the valve accelerations vary with the square of the said speeds. Thus profiles and leverages which give satisfactory passages at short cut offs produce dangerous accelerations at latest cut offs. The valve stroke at shortest cut off must therefore be greatly diminished resulting in a prejudicial wire drawing.

The object of this invention is to overcome the above disadvantages and to allow wide passages at shortest cut offs.

The invention consists essentially in the feature that the heretofore invariable kinematic chain leading to the valve is opened at a point after the first member possessing a motion similar to that of the valve and the two ends of the chain are connected to each other through a device which allows the ratio of the travels of the two chain ends to be modified and controlled by the cut off. This ratio can be varied within very large limits without danger of too high accelerations at the shortest cut offs, as with the known oscillating poppet valve gears the opening accelerations at these cut offs are, as a rule, less than the twentieth of the corresponding accelerations at the latest cut offs (at same engine speeds), and in any motion a linear increase of the travels implies same linear increase of the accelerations.

Figure 1:
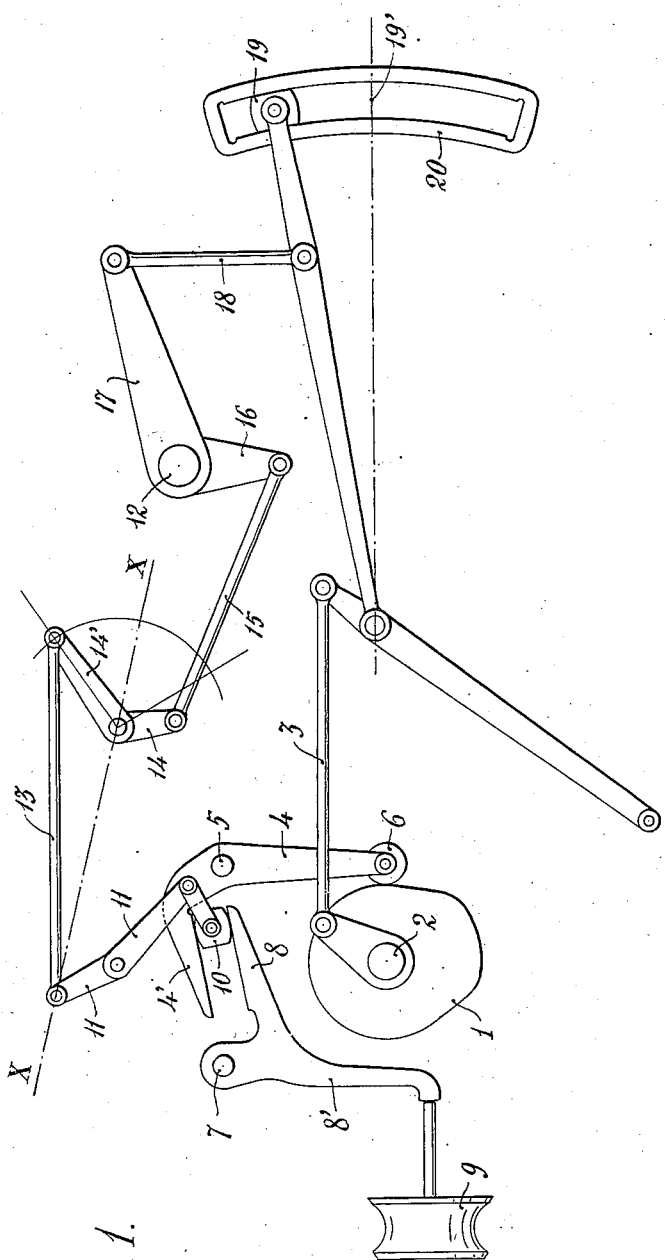
Figure 2:
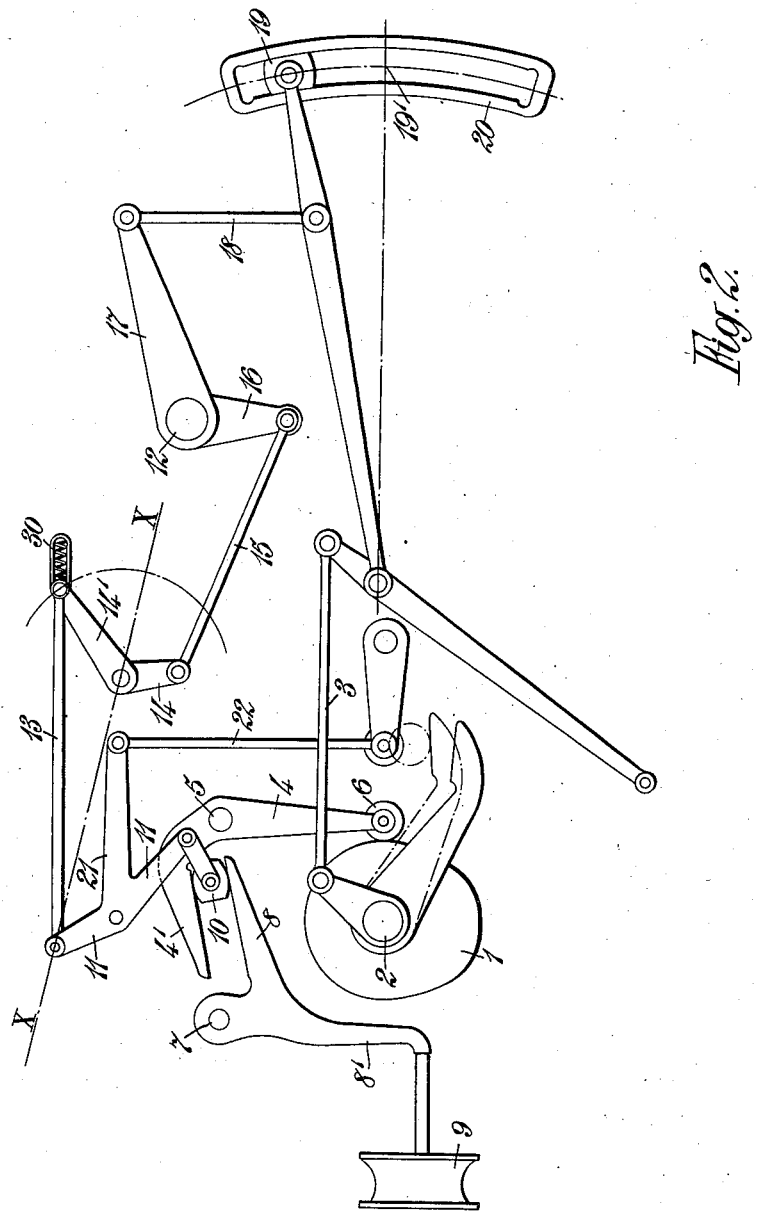
Figure 3:
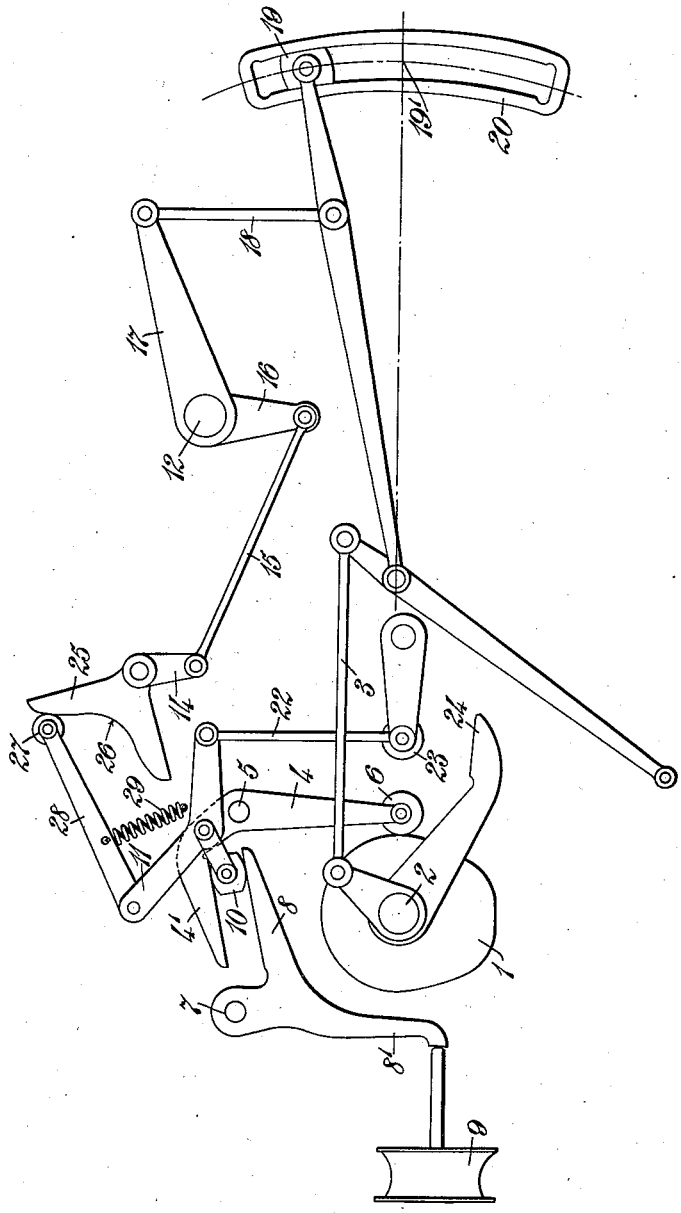

In the accompanying drawings, Figures 1, 2 and 3 represent schematically an embodiment of this invention.

In Fig. 1, a cam 1, fitted on shaft 2, is driven by rod 3, which receives from an oscillating valve gear of known type the reciprocating motion of a common single-piston distributing valve. Cam 1 pushes roller 6 of a bellcrank lever 4—4′, which oscillates on shaft 5. A second bellcrank lever 8—8′ oscillates on shaft 7 and can operate valve 9 through the end of arm 8′.

Arm 4′ of bellcrank lever 4—4′ and arm 8 of bellcrank lever 8—8′, which in this case represent the two ends of the above mentioned heretofore invariable kinematic chain, are connected to each other through the shiftable stone 10, whose position fixes the active lengths of arms 4′ and 8 and consequently the ratio between the corresponding oscillations of the two bellcrank levers, as well as the ratio between the travels of valve 9 and roller 6.

This ratio is maximum (i. e. maximum valve-travel for a given roller displacement) with stone 10 in a position nearest to shaft 7, whilst the drawings showing the stone 10 in its position nearest to shaft 5, corresponds to the maximum value of same ratio, in which the valve travel is minimum for a given roller displacement.

The position of stone 10 is controlled by lever 11—11, which can be connected with the mechanism controlling the cut off in order to let the above ratio vary automatically with the cut off.

In Fig. 1, lever 11—11 is connected to shaft 12 by a rod 13 operated by a double armed lever 14—14′ which is driven by rod 15 linked to arm 16. The shaft 12 controls also, by arm 17 and rod 18, the position of the stone 19 in the oscillating segment 20 of a valve gear of known type, in this case a Walschaerts gear.

The drawings show the reversing shaft 12 holding the stone 19 in one of the end positions of the slot in the oscillating segment: therefore in a position of maximum cut off for the engine rotating in a given direction we will consider forward motion, whilst the stone 10 is maintained in its position nearest to shaft 5, to which position corresponds the minimum valve travel referred to the roller lift.

If now, in order to diminish the cut off, shaft 12 rotates approaching stone 19 to its midway position 19′, then arm 14′ of lever 14—14′ approaches also its mid position along line X—X and stone 10 approaches shaft 7. The dimensions, shape and positions of the various parts are so designed, that, when stone 19 reaches its mid position 19′, arm 14′ reaches also its mid position along line X—X, whilst stone 10 reaches its position nearest to shaft 7. In this position, of minimum cut off, the ratio between valve- and roller-travels becomes maximum.

On further rotating of the reversing shaft 12, the engine motion reverses and whilst stone 19 approaches to the lower end of the slotted segment and therefore increases the cut off in backward motion, stone 10 slides back from shaft 7 towards shaft 5, i. e. the ratio between the valveand roller-travel decreases, as then arm 14' having passed its dead point position along line X—X pushes back rod 13. The above mentioned dimensions, forms and positions of the various parts fulfil also to the condition that, whilst stone 19 reaches its lower position in the slotted segment, of maximum cut off in backward motion, stone 10 has retrieved to its position nearest to shaft 5, to which corresponds the minimum ratio between valve- and roller-travel.

Fig. 2 shows diagrammatically a device which can be added in order to prevent any trouble which may arise if, for any reason, the connection between the device modifying the valve travel and the reversing mechanism fails or is incorrect. In this event it may occur that stone 10 comes nearer to shaft 7 than what it should, following the cut off. Then the valve stroke becomes longer than designed and might in some cases, cause troubles and breakages.

To avoid this, a third arm 21 (Figure 2) is added to double lever 11—11 and this arm is controlled by roller 23 through rod 22. On camshaft 2 is fitted a properly shaped arm 24 which oscillates with cam 1 and the path of its oscillation depends on the position of the stone 19 on which also depends the position of the stone 10. If for any reason (as for instance accidental bending of rod 13 or 15 or the failure of a pin of the linkage connecting stone 19 with lever 21) stone 10 approaches nearer shaft 7 than it should do following the cut-off thereby producing an increase in the travel of the valves beyond the allowed limits, the roller 23 moves to so low a position (as shown by dotted lines) that the end of arm 24, which is in the correct position for the operating conditions since it is integral with the cam 1, in its oscillation strikes roller 23 and pushes it upwards together with stone 10 into the correct position. This displacement is allowed by the feature that the end of rod 13 connected with arm 24 is provided with a slot containing a spring 30, which allows a deformation of the kinematic chain.

Fig. 3 shows diagrammatically an alternative device for controlling stone 10 by reversing shaft 12. A double armed cam 25 is fixed to lever 14 and the cam profile 26 pushes roller 27 carried on the end of arm 28 of double lever 28—11 controlling the position of stone 10. The profile 26 is established according to the desired law of variation of the valve- and roller-travels at the various cut offs and roller 27 is kept in contact by any available means: for instance by a spring.

The same results can be obtained whichever might be the device adopted to pass from the fundamental motion of a single-piston valve to the motion of the separate valves instead of the couple cam-roller shown as example.

The same can be said with reference to the gear creating the fundamental harmonic oscillating motion which, in the given example, is the known Walschaerts gear, but can be of any other known or unknown type.

For simplicity's sake only double seated poppet valves have been considered, but, of course, the invention applies to any type of valve, single seated, poppet or sliding.

What I claim is:

1. An oscillating valve gear for engines operating with variable cut off and provided with separate inlet and exhaust valves wherein the invariable kinematical chain used heretofore and connecting the valves with the oscillating gear is opened in a point between the valve and the first member possessing a motion similar to that of the same valve, and a variable coupling is inserted between the ends of the opened chain to close it, the ratio of the travels of the two ends of the chain being adjustable at will.

2. An oscillating valve gear for engines operating with variable cut off and provided with separate inlet and exhaust valves wherein the invariable kinematical chain used heretofore and connecting the valves with the oscillating gear is opened in a point between the valve and the first member possessing a motion similar to that of the same valve, and a variable coupling inserted between the two ends of the opened chain is connected to the control of the cut off, the ratio between the travels of the two ends of the opened chain varying automatically with the cut off.

3. An oscillating valve gear for engines operating with variable cut off and provided with separate inlet and exhaust valves wherein the invariable kinematical chain used heretofore and connecting the valves with the oscillating gear is opened in a point between the valve and the first member possessing a motion similar to that of the same valve, the two ends of the opened chain being two facing arms of two levers oscillating in opposite directions, the oscillation axis of one arm being near to the end of the other and the oscillation axis of the latter being near to the end of the former, the two arms having their facing sides parallel when the valve is closed and transmitting their respective motion through a stone which can be shifted along the facing surfaces of the said arms.

4. An oscillating valve gear for engines operating with variable cut off and provided with separate inlet and exhaust valves wherein the invariable kinematical chain used heretofore and connecting the valves with the oscillating gear is opened in a point between the valve and the first member possessing a motion similar to that of the same valve, the two ends of the opened chain being two facing arms of two levers oscillating in opposite directions, the oscillation axis of one arm being near to the end of the other and the oscillation axis of the latter being near to the end of the former, the two arms having their facing sides parallel when the valve is closed and transmitting their respective motion through a stone which can be shifted along the facing surfaces of the said arms, the shifting stone being connected with the reversing shaft of an oscillating gear by a chain of levers and rods, in such a way that at the latest cut offs in both forward- and backward-motion the said stone comes near to the oscillation axis of the first or leading arm, whereas at the shortest cut offs the same stone comes near to the oscillation axis of the said second arm.

5. An oscillating valve gear for engines operating with variable cut off and provided with separate inlet and exhaust valves wherein the invariable kinematical chain used heretofore and connecting the valves with the oscillating gear is opened in a point between the valve and the first member possessing a motion similar to that of the same valve, the two ends of the opened chain being two facing arms of two levers oscillating in opposite directions, the oscillation axis of one arm being near to the end of the other and the oscillation axis of the latter being near to the end of the former, the two arms having their facing sides parallel when the valve is closed and transmitting their respective motion through a stone which can be shifted along the facing surfaces of the said arms, the shifting stone being connected to the reversing shaft of a link motioned oscillating valve gear by means of a cam and roller device for pushing the stone and keeping it in proper position.

6. An oscillating valve gear for engines operating with variable cut off and provided with separate inlet and exhaust valves wherein the invariable kinematical chain used heretofore and connecting the valves with the oscillating gear is opened in a point between the valve and the first member possessing a motion similar to that of the same valve, and a variable coupling inserted between the two ends of the opened chain is connected to the control of the cut off, the ratio between the travels of the two ends of the opened chain varying automatically with the cut off, comprising a safety device wherein a member oscillating in connection with the oscillating gear pushes the shiftable member of the variable coupling to its correct position according to the cut-off, whenever for any reason said member is in such an incorrect position as to increase the valve travel beyond the allowed limits.

7. An oscillating valve gear for engines operating with variable cut off and provided with separate inlet and exhaust valves wherein the invariable kinematical chain used heretofore and connecting the valves with the oscillating gear is opened in a point between the valve and the first member possessing a motion similar to that of the same valve, the two ends of the opened chain being two facing arms of two levers oscillating in opposite directions, the oscillation axis of one arm being near to the end of the other and the oscillation axis of the latter being near to the end of the former, the two arms having their facing sides parallel when the valve is closed and transmitting their respective motion through a stone which can be shifted along the facing surfaces of the said arms, the shifting stone being connected to the reversing shaft of a link motioned or equivalent oscillating valve gear by means of a cam and roller device for pushing the stone and keeping it in proper position, a safety device being provided comprising an arm oscillating with the valve controlling cam and pushing a roller connected to a series of levers controlling the stone and thereby shifting the said stone whenever necessary in order to avoid dangerous valve strokes.

ARTURO CAPROTTI.